(12) United States Patent
Hofmann et al.

(10) Patent No.: US 7,134,725 B2
(45) Date of Patent: Nov. 14, 2006

(54) MOTOR VEHICLE SEAT

(75) Inventors: Jochen Hofmann, Marktgraitz (DE); Olaf Göbel, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/989,716

(22) Filed: Nov. 15, 2004

(65) Prior Publication Data

US 2005/0110323 A1    May 26, 2005

(30) Foreign Application Priority Data

Nov. 26, 2003   (DE)   ................................ 103 55 765

(51) Int. Cl.
- *B60N 2/04*   (2006.01)
- *B60N 2/14*   (2006.01)
- *B60N 2/20*   (2006.01)
- *B60N 2/36*   (2006.01)

(52) U.S. Cl. .............................. 297/378.1; 297/378.12; 297/378.13; 297/378.14; 297/331; 297/334; 297/15; 296/65.01; 296/65.05; 296/65.09; 296/65.16

(58) Field of Classification Search ................. 297/15, 297/378.1, 378.11, 378.12, 378.13, 378.14, 297/331, 334; 296/65.01, 65.05, 65.09, 65.16
See application file for complete search history.

(56) References Cited

U.S. PATENT DOCUMENTS

| | | | |
|---|---|---|---|
| 4,597,321 A | | 7/1986 | Gabelish et al. ............... 91/470 |
| 4,869,541 A | * | 9/1989 | Wainwright ............. 296/65.09 |
| 5,527,087 A | * | 6/1996 | Takeda et al. ................. 297/15 |
| 5,536,069 A | * | 7/1996 | Bray et al. .............. 297/362.11 |
| 5,570,931 A | * | 11/1996 | Kargilis et al. ......... 297/378.12 |
| 5,634,686 A | * | 6/1997 | Okazaki ............... 296/65.09 X |
| 5,871,255 A | * | 2/1999 | Harland et al. .............. 297/257 |
| 6,039,401 A | * | 3/2000 | Rus ........................ 297/378.13 |
| 6,123,380 A | * | 9/2000 | Sturt et al. ................. 297/15 X |
| 6,279,982 B1 | * | 8/2001 | Nishimura et al. ........ 297/15 X |
| 6,375,255 B1 | * | 4/2002 | Maruta et al. ................. 297/15 |
| 6,644,730 B1 | * | 11/2003 | Sugiura et al. ................ 297/15 |
| 6,773,067 B1 | * | 8/2004 | Kim ........................... 297/334 |

(Continued)

FOREIGN PATENT DOCUMENTS

DE    19533932    3/1997

(Continued)

*Primary Examiner*—Rodney B White
*Assistant Examiner*—Stephen Vu
(74) *Attorney, Agent, or Firm*—Renner, Otto, Boisselle & Sklar, LLP

(57) ABSTRACT

A motor vehicle seat including a foldable backrest and a lowerable seat part, wherein the backrest is foldable toward the seat part and a mechanism is provided so the seat part is lowerable from a use position into a forward position, wherein a coupling element is provided to couple folding-down of the backrest to forward movement and lowering of the seat part, and a locking mechanism is provided to lock the seat part in the use position. The coupling element may unlock the locking mechanism as the backrest is folded forward toward the seat part at a predefined angle of inclination, so that inclination of the backrest can be changed while the seat part is locked by folding the backrest forward to the predefined angle of inclination and the unlocked seat part is lowered into the forward position by folding the backrest further forward.

23 Claims, 18 Drawing Sheets

U.S. PATENT DOCUMENTS

| | | | |
|---|---|---|---|
| 6,827,394 B1 * | 12/2004 | Watanabe et al. | 297/15 |
| 6,971,700 B1 * | 12/2005 | Blanger et al. | 296/65.16 |
| 7,014,263 B1 * | 3/2006 | Mukoujima et al. | 297/378.1 X |
| 7,021,716 B1 * | 4/2006 | Persad et al. | 297/378.12 |
| 2004/0056521 A1 * | 3/2004 | Kayumi et al. | 297/334 |
| 2004/0212237 A1 * | 10/2004 | Epaud et al. | 297/331 |
| 2005/0017532 A1 * | 1/2005 | Oyama | 296/65.05 |

FOREIGN PATENT DOCUMENTS

| | | |
|---|---|---|
| DE | 19904009 | 5/2000 |
| DE | 19932214 | 1/2001 |
| DE | 20114059 | 1/2003 |

* cited by examiner

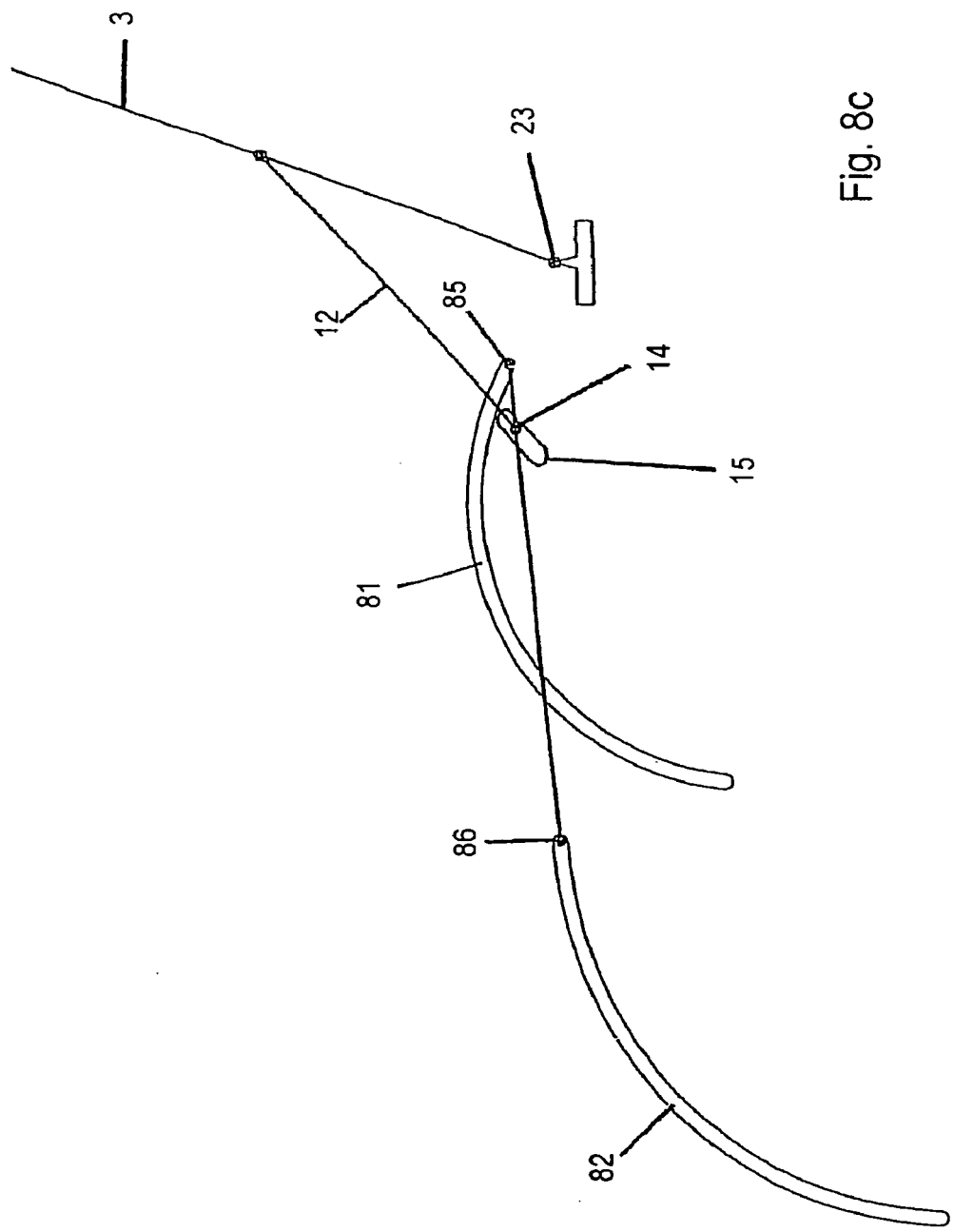

MOTOR VEHICLE SEAT

TECHNICAL FIELD

The present invention relates to a motor vehicle seat, in particular a motor vehicle rear seat for the second or third row of seats of a motor vehicle.

BACKGROUND

Such a motor vehicle seat designed as the middle part of a rear seat is disclosed in DE 100 55 205 A1. The seat part is mounted such that it can be moved in a pivoting manner by means of a front and a rear pivot lever device between a seat position and a flat position in which it is moved forward and lowered. The backrest is connected to the seat part by means of a connecting lever device such that the seat part assumes the raised seat position in the folded-up position of the backrest and assumes the lowered flat position or storing position in the folded-forward position.

The connecting lever device comprises a two-arm lever element, a connecting lever element and a coupling lever element. The connecting lever device is arrested in the use position of the seat part and is released by actuating a cable pull. Unlocking thus requires a Bowden cable system so that the structure as a whole is relatively complex. The Bowden cable system requires additional components, and this increases the costs of a motor vehicle seat.

DE 199 32 214 A1 discloses a vehicle seat in which the seat part can be moved forward as the backrest is folded down from an articulation point of the backrest. The backrest can be folded down toward the seat part only following actuation of an unlocking button which releases a safety catch. In the process, on the one hand the backrest is unlocked and on the other hand a clip is released so that the seat part can move forward. In order to couple the movement of the backrest and of the seat part, a mechanism with a cable pull and a spring that is not continuously biased is provided, and this mechanism is relatively complex. Without prior actuation of the unlocking button, the inclination of the backrest can be changed only by turning a hand-wheel.

DE 199 04 009 C1 discloses a motor vehicle rear seat with a foldable backrest and a seat part that can be lowered. The seat part is mounted pivotably on an intermediate frame which in turn is mounted pivotably on the floor of the vehicle. The backrest is coupled by means of a mechanical coupling element to a rod system which couples the seat part to the intermediate frame such that it can be moved in a pivoting manner. The seat as a whole can be moved forward only when it is unlocked centrally by means of a handle. The seat is relatively complex and is composed of a large number of elements.

DE 195 33 932 A1 discloses a front seat for motor vehicles in which the backrest is articulated pivotably on a carriage, wherein the carriage is mounted such that it can be displaced longitudinally and on a carriage guide fixed to the floor of the vehicle. The seat part is first pivoted forward and then the backrest with the carriage is pushed forward to come to bear against the forward-pivoted seat part. A central locking hook is provided which unlocks the seat by actuating a cable pull. Additional locking elements are thus required, so that the seat is designed in a relatively complex manner.

SUMMARY

It is an object of the present invention to avoid the above disadvantages and to provide a motor vehicle seat of the above mentioned type which has a simple and cost-effective design and can be operated in a simple manner.

The present invention provides a motor vehicle seat, in particular a motor vehicle rear seat, comprising a foldable backrest and a lowerable seat part, wherein the backrest is foldable toward the seat part and a mechanism is provided so that the seat part can be lowered from a use position into a forward position, wherein a coupling element is provided in order to couple the folding-down of the backrest to the forward movement and lowering of the seat part, and wherein a locking mechanism is provided in order to lock the seat part in the use position.

According to the invention, the coupling element of the motor vehicle seat is characterized in that is designed to unlock or release the locking mechanism as the backrest is folded forward toward the seat part when a predefined angle of inclination is reached, so that the inclination of the backrest can be changed while the seat part is still locked by folding the backrest forward up to the predefined angle of inclination and so that the unlocked or released seat part can be lowered into the forward position by folding the backrest further forward.

According to the invention, the coupling element automatically actuates the locking mechanism to unlock or release the seat part when the backrest is folded forward to the predefined angle of inclination. There is thus no longer any need for additional components for locking and unlocking the seat part, and this helps to save costs and makes the design simpler. It is furthermore advantageous that the motor vehicle seat can be operated in a simple and intuitive manner. During a first phase, in which the adjustment of the backrest is decoupled from the folding-down of the seat, the angle of inclination of the backrest can be adjusted by free and unhindered pivoting of the backrest without unlocking or adjusting the seat part. During a second phase, in which the backrest is folded forward to the predefined angle of inclination in order to actuate the locking mechanism of the seat part, the seat part is automatically unlocked without it being necessary to actuate further elements in order to do so.

During a last phase, the seat part is finally moved forward and lowered by folding the backrest further forward, wherein this movement of the seat part is driven by the folding-down of the backrest because the backrest is coupled to an adjustment mechanism for adjusting or regulating the seat part.

Between the aforementioned second phase and the aforementioned last phase, there may be provided a further phase during which the seat part is unlocked but the adjustment mechanism for adjusting or regulating the seat part is not yet actuated as the backrest is folded further forward, so that manufacturing tolerances and deviations caused by varying basic settings of the motor vehicle seat can be compensated.

According to a further embodiment, the mechanism for adjusting the seat part is designed as a pivot lever device comprising a front and a rear adjustment lever, preferably in the form of a rocker.

In principle, however, the mechanism for adjusting or regulating the seat part may be designed as any other mechanism which is designed to move the seat part forward and lower it at the same time. By way of example, at least one suitably designed guide member may be provided on a side part that is fixedly attached to the vehicle, in order to guide the seat part in a suitable manner, for which purpose for example a pin or the like engages in the at least one guide member. One or more such guide members may of course also be combined with a pivot lever or the like.

The locking mechanism for locking the seat part in the use position may be designed in a known manner as a bar, rotary catch, ratchet mechanism or the like. Locking preferably takes place in a manner fixed to the bodywork at anchoring points which are provided on the floor of the vehicle, but may in principle also take place at elements that can be moved longitudinally along the floor of the vehicle, for example on a seat carriage guide known from the prior art.

According to another embodiment, the coupling element comprises at least one coupling lever which is articulated outside the pivot axle of the backrest and has one end which cooperates with the mechanism for moving forward and lowering the seat part in order to couple the backrest to the unlocked seat part when said backrest is folded further forward from the predefined angle of inclination and thus to drive the movement for moving forward and lowering the seat part. By way of example, a rotary slide articulation may be provided at one end of the coupling lever, via which rotary slide articulation the pivoting movement of the backrest is transferred to the mechanism for adjusting or moving forward and lowering the seat part.

According to another embodiment, the locking element has a locking claw which engages in a locking catch fixed to the bodywork or in a locking bolt fixed to the bodywork or presses down said locking catch or locking bolt. Preferably, the locking element is designed as a lever which can pivot about a pivot axle fixed to the bodywork. This allows a particularly compact design.

According to another embodiment, the coupling lever respectively has a protrusion or a pin which comes to bear against the associated locking lever when the predefined angle of inclination is reached, in order to pivot said locking lever about the pivot axle fixed to the bodywork when the backrest is folded further forward.

According to a further embodiment, the locking mechanism may comprise a first and a second locking element which cooperate with one another in order to lock the seat part in the use position. By virtue of the two-part design of the locking mechanism, the unlocking of the seat part can be controlled in an advantageously simple and precise manner. By way of example, the locking elements may together form a gear mechanism for actuating or releasing a locking element.

In this case, the coupling lever may cooperate with the second locking element such that the second locking element releases the first locking element when the backrest is folded further forward from the predefined angle of inclination, in order to release the seat part. However, before the predefined angle of inclination is reached, that is to say during the aforementioned first phase of the adjustment of the backrest, only the first locking element is actuated, for example as a preparatory operation, in order to allow rapid and precise unlocking of the seat part.

According to another preferred embodiment, the first and second locking element is in each case designed as a pivotably mounted lever.

For precise control of the unlocking of the seat part, the second lever may have a shoulder and a bearing surface opposite the shoulder for coupling to the coupling lever, wherein the shoulder releases the first lever when the backrest is folded further forward from the predefined angle of inclination.

A locking bolt for locking the seat part in the use position may be connected or coupled to the seat part, for example via the mechanism for moving forward and lowering the seat part. This embodiment means that there is no need for a locking bolt or the like fixed to the bodywork, and this proves very advantageous in particular in the case of seats or seat benches that can be removed.

According to another embodiment, the respective coupling lever comprises a recess, for example in the form of a longitudinal hole, in which there engages a protrusion, for example a bolt or pin, of one lever of the pivot lever device, in order to form the rotary slide articulation. Alternatively, a cam and a corresponding slide or guide for the cam may also be provided in order to couple the backrest to the seat part.

According to another embodiment, the protrusion or pin bears against the rear end of the recess when the seat part is pivoted forward and lowered during the above-described last phase as the backrest is folded further forward.

The recess may be designed such that a gap or clearance is left between the protrusion or pin and the rear end of the recess when the backrest is inclined at the predefined angle of inclination and the seat part is unlocked. The seat part is thus not yet adjusted as the backrest is folded further forward, and this allows compensation of manufacturing tolerances and the like.

A very particularly compact design can be achieved if the mechanism for moving forward and lowering the seat part comprises a lever which is arranged between the locking element and the coupling lever. Preferably, one lever of the mechanism for moving forward and lowering the seat part and the locking element can pivot about a common axle.

According to a further embodiment, the locking element is designed as a press-down element, and the seat part is unlocked or released by pressing down the press-down element.

According to a further embodiment, the coupling lever is designed as a two-part lever, wherein at least one stop catch or carrier is formed on the mechanism for moving forward and lowering the seat part, so that when the backrest is folded further forward the coupling lever bearing against a stop catch actuates the mechanism for moving the seat part forward and lowering it. Such a stop catch or carrier may be designed for example as a protrusion, cut-out or depression, opening or coupling element.

There may also be provided on the mechanism for moving forward and lowering the seat part an additional, correspondingly designed carrier which brings about coupling of the coupling lever to the mechanism for adjusting the seat part, so that when the backrest is folded back to the predefined angle of inclination the seat part is returned or carried from the forward, lowered position to the use position and can be locked in said use position again.

Very particularly preferably, the motor vehicle seat is designed as a rear seat for motor vehicles with two or more rows of seats, so that an essentially horizontal loading area can be created by folding the backrest forward and moving the seat part forward and lowering it.

BRIEF DESCRIPTION OF DRAWINGS

The invention will be described below by way of example and with reference to the attached drawings, from which further features, advantages and objects will become apparent to a person skilled in the art. In the drawings:

FIGS. 8a–8c show by way of comparison further possible embodiments with at least one guide member for guiding the seat part during the forward movement and lowering of the seat part.

DETAILED DESCRIPTION

Figure 1A:
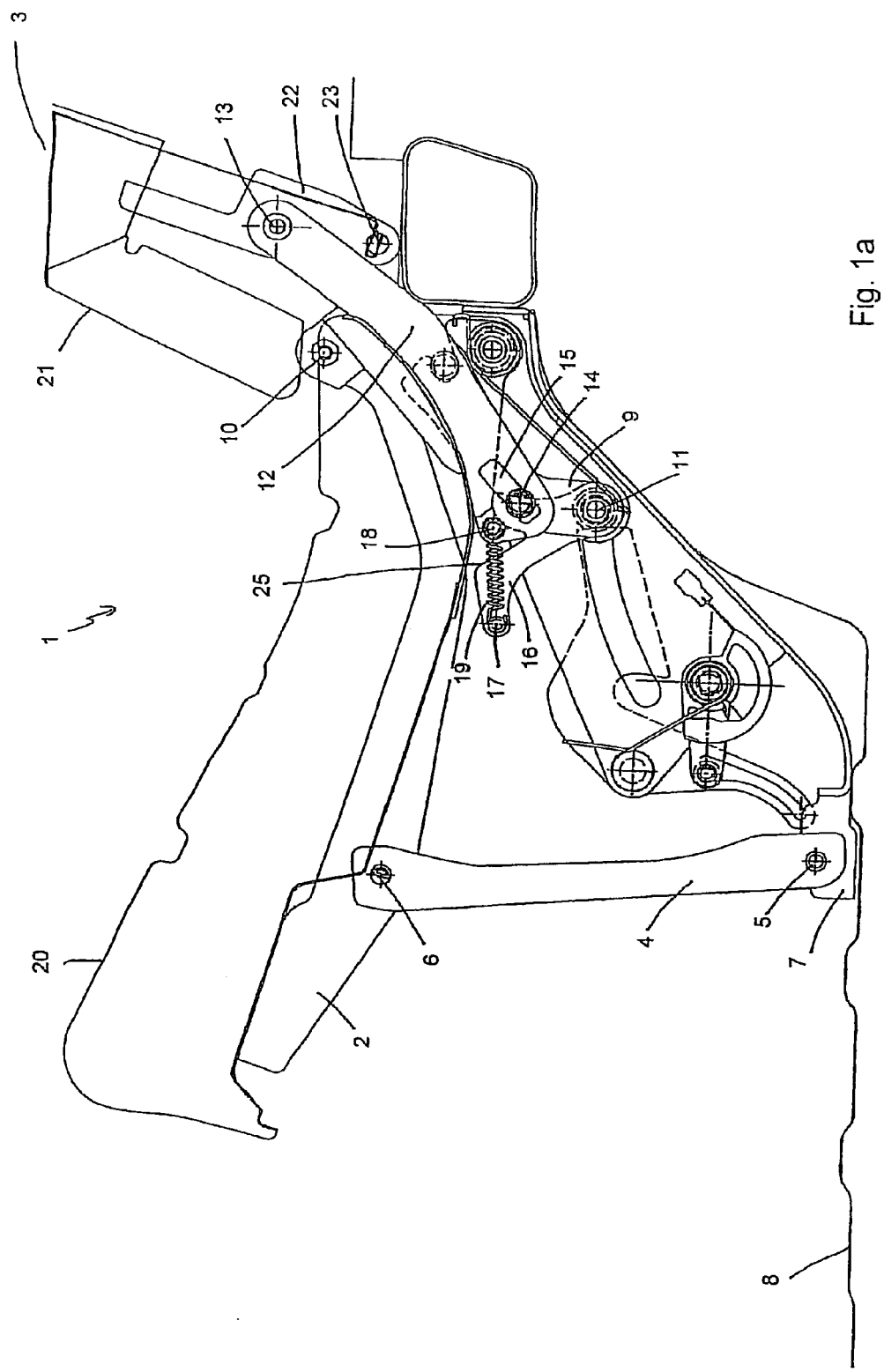
FIGS. 1a and 1b show in a schematic side view a motor vehicle seat according to a first and a second embodiment of the present invention in a use position.

In the figures, identical reference numerals refer to elements or groups of elements that are identical or have essentially the same function.

FIG. 1a shows in a schematic side view a motor vehicle seat according to a first embodiment of the present invention in a use position. The motor vehicle seat (hereinafter referred to in brief as "seat"), which is referenced 1 as a whole, is designed as shown in FIG. 1a by way of example as a rear seat which is attached to the vehicle floor 8 via the schematically shown anchoring element 7. The seat 1 comprises a seat part 2 with padding 20 and a backrest 3 with padding 21. In the use position shown in FIG. 1a, the backrest 3 is inclined backward at an acute angle and the seat part 2 with the padding 20 is inclined obliquely backward at an acute angle.

The backrest 3 can be pivoted about the pivot axle 23 and folded forward. The seat part 2 is locked in the use position shown in FIG. 1a and in the use position can thus not be pivoted forward and/or lowered. To lock the seat part 2, a locking element 16 designed as a lever is provided which in a known manner has a locking claw that engages in a locking catch fixed to the bodywork or in a locking bolt fixed to the bodywork. The locking lever 16 can be pivoted about the lower pivot axle 11.

In the use position, that is to say when the seat part 2 is locked, the function of adjusting or regulating the angle of inclination of the backrest 3 is decoupled from the function of pivoting and lowering the seat part 2, as will be explained in more detail below. In the use position shown in FIG. 1a, the angle of inclination of the backrest 3 can be pivoted forward up to a predefined angle of inclination, as can be seen from FIG. 3a. To fix the angle of inclination of the backrest 3, a locking mechanism may be provided. An example of such a locking mechanism is shown by way of example in FIG. 6.

Figure 6:
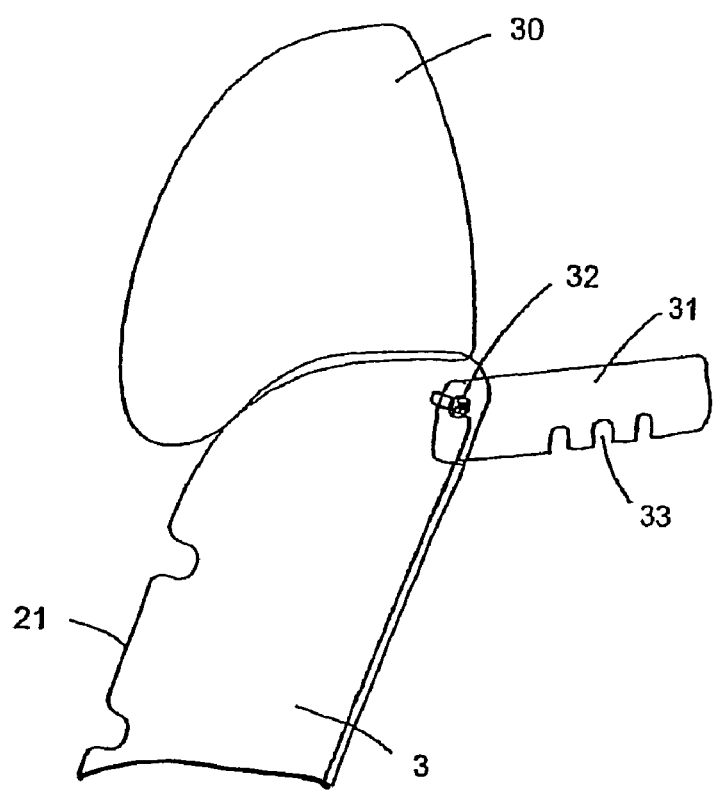
FIG. 6 is a detail view of the motor vehicle seat of FIG. 1.

As shown in FIG. 6, provided in the upper region of the backrest 3, below the headrest 30, is a locking lever 31 which can pivot about the pivot axle 32 and on its lower edge has a comb-like structure in the form of a number of cut-outs 33 which are spaced apart from one another preferably equidistantly. To fix the angle of inclination of the backrest 3, one of the cut-outs 33 of the locking lever 31 engages in the known manner in a bolt or safety catch fixed to the bodywork. In principle, to adjust the angle of inclination of the backrest 3, a rotary wheel or the like may be provided in order to pivot the backrest 3 about the pivot axle 23 (FIG. 1a). By releasing the locking mechanism, in particular by releasing the locking lever 31 shown in FIG. 6, the backrest 3 is released and the backrest 3 can be folded toward the seat part. According to the invention, no cable pull or the like is actuated to unlock the seat part 2 when the locking mechanism of the backrest 3 is released.

The mechanism for folding the backrest 3 forward and for pivoting and lowering the seat part 2 will be described in more detail below with reference to FIG. 1a. To pivot the seat part 2 forward and lower it, a pivot lever device is provided which comprises a front adjustment lever 4 and a rear adjustment lever 9. The front adjustment lever 4 can pivot about the lower pivot axle 5 of the anchoring element 7 fixed to the bodywork and is articulated to the seat part 2 in the region of the upper pivot axle 6. The rear adjustment lever 9 can pivot about the lower pivot axle 11 fixed to the bodywork and is articulated to the seat part 2 in the region of the upper pivot axle 10. The seat part 2 is designed as a rigid frame which connects the upper pivot axles 6, 10 to one another. On the opposite side of the seat part 2, another front adjustment lever and another rear adjustment lever 9 may be provided in a comparable manner.

To couple the backrest 3 to the seat part 2, a coupling lever 12 is provided, one end of which can pivot about the pivot axle 13 which is arranged on the side face 22 of the backrest 3 at a distance from the pivot axle 23 of the backrest 3, and the other end of which is designed as a longitudinal hole 15 in order to couple the coupling lever 12 to the rear adjustment lever 9 via a rotary slide articulation.

As shown in FIG. 1a, formed on the outer side of the rear adjustment lever 9 is a pin 14 or a comparable protrusion which engages in the longitudinal hole 15 and is guided in the latter. As shown in FIG. 1a, the pin 14 or the protrusion is spaced apart from the lower pivot axle 11 of the rear adjustment lever 9, in order to form a rotary slide articulation.

As shown in FIG. 1a, the rear adjustment lever 9 is arranged between the locking lever 16 and the coupling lever 12. Arranged at the front end of the coupling lever 12 is a pin 18 which projects inward toward the seat and in the use position shown in FIG. 1a does not bear against the obliquely running bearing surface 25 of the locking lever 16. Provided at the free end of the locking lever 16 is a pin 17 which projects outward away from the seat. A tension spring 19 is suspended in the pins 17, 18 in order to couple the coupling lever 12 to the locking lever 16 and bias them with respect to one another.

As shown in FIG. 1a, in the use position a gap is formed between the lower end of the longitudinal hole 15 and the pin 14, said gap serving to compensate for manufacturing tolerances or serving as play during adjustment or regulation of the seat 1. However, overall, in the use position the pin 14 is located close to the lower end of the longitudinal hole 15.

Figure 1B:
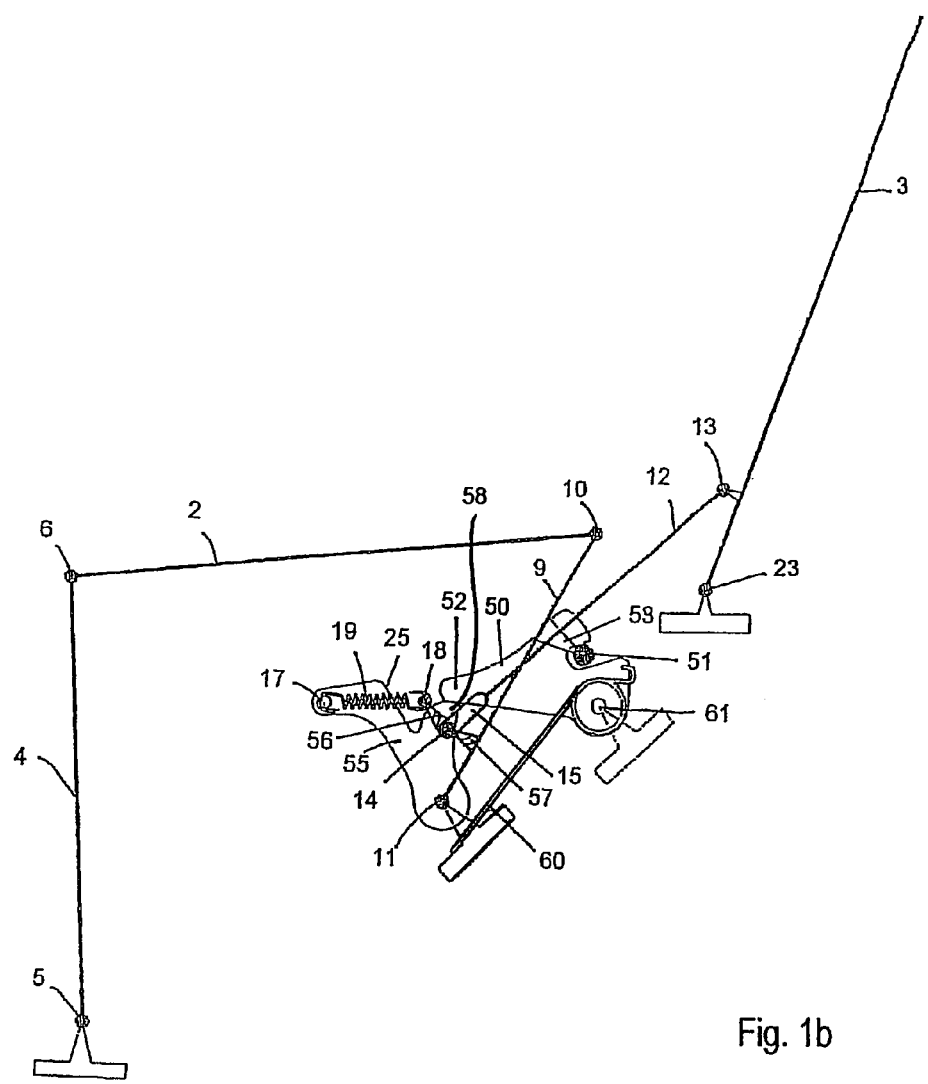

According to FIG. 1b, a second embodiment of a motor vehicle seat according to the invention in the same position as in FIG. 1a will be described. In FIG. 1b, the elements that are mainly used for adjustment of the seat part, in particular the adjustment levers, are shown schematically as line connections in order to explain further details of an example of a locking mechanism for locking the seat part. In FIGS. 1a and 1b, identical reference numerals refer to identical elements, the description of which has been omitted below.

As shown in FIG. 1b, the locking mechanism for locking the seat part 2 has a first locking lever 50 and a second lever 55 which can pivot about an axle 61 and 11, respectively, said axles being fixed to the bodywork. A recess for receiving and locking the locking bolt 51 is provided at the rear end of the first locking lever 50. The front actuating end 52 of the locking lever 50 bears against a shoulder 58 of the second lever 55.

As shown in FIG. 1b, the pin 18 is connected to the coupling lever 12 via a connecting element 56, for example a carrier or a shoulder, and the pin 14 engaging in the longitudinal hole 15 is connected to the rear adjustment lever 9 via a corresponding connecting element 57. The pin 18 is connected to the pin 17 via the spring 19 biased in the locking device, in order to couple the coupling lever to the second lever 55.

As shown in FIG. 1b, the pin 18 does not yet bear against the bearing surface 25 of the second lever 55, said bearing surface lying opposite the shoulder 58. In this position, the two levers 50 and 55 form a lock for locking the seat part 2.

Figure 2A:
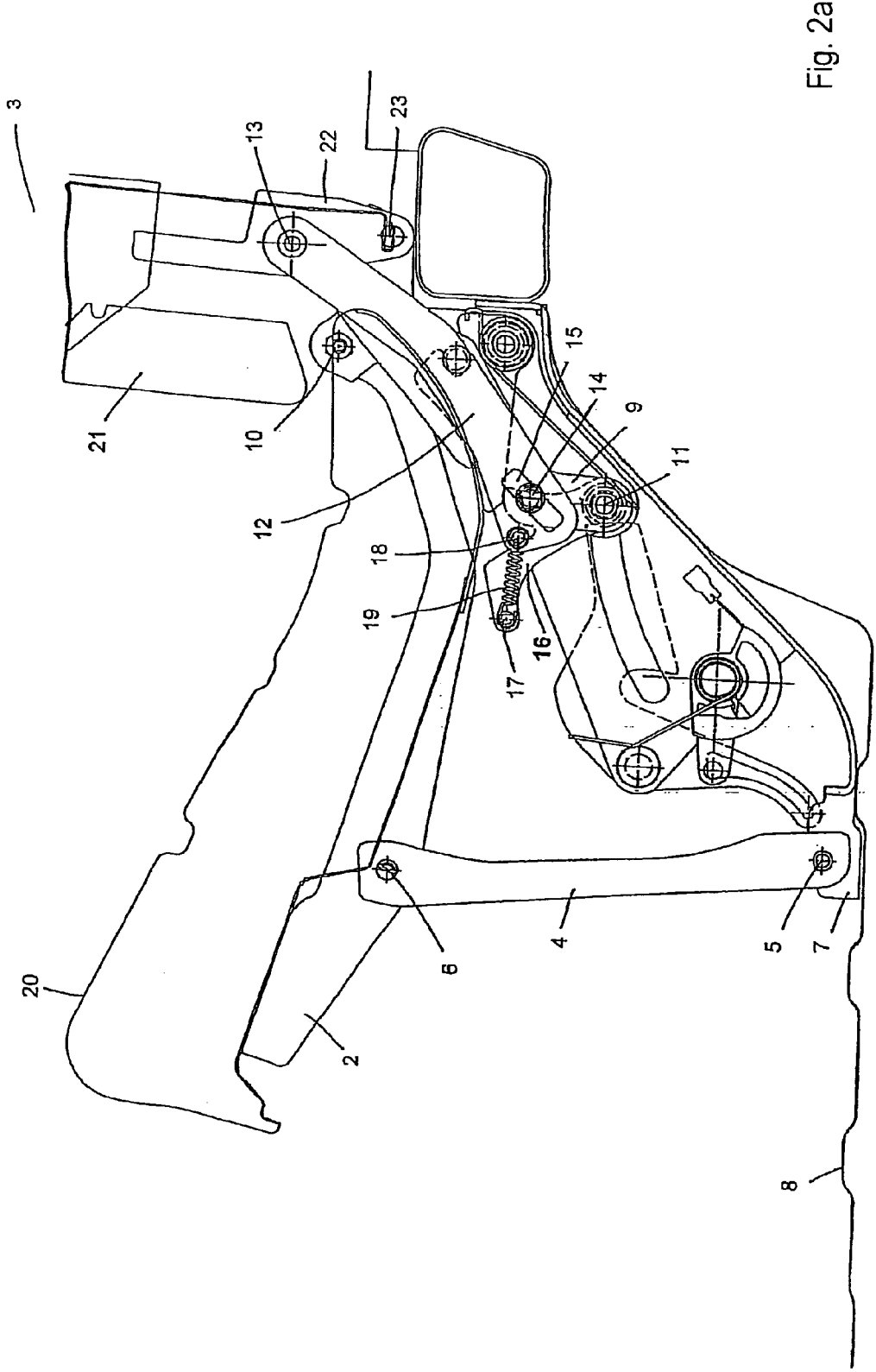
FIGS. 2a and 2b show the motor vehicle seat of FIGS. 1a and 1b, wherein the backrest is more or less vertical and the seat part is locked.

A procedure for folding down the backrest and for creating a loading area will be described below with reference to FIGS. 2a to 5a and 2b to 5b respectively. The first and second embodiments are compared directly. Once the locking mechanism of the backrest has been released (cf. FIG. 6), as shown in FIG. 2a the backrest 3 is folded forward into an essentially vertical position. By folding the backrest 3 forward, the coupling lever 12 is pushed downward and the pin 14 slides in the longitudinal hole 15 toward the upper end of the longitudinal hole 15. Finally, the pin 18 comes to bear against the bearing surface 25 of the locking lever 16. As shown in FIG. 2a, the seat part 2 is still in the use position, in which the locking lever 16 locks the seat part 2.

Figure 2B:
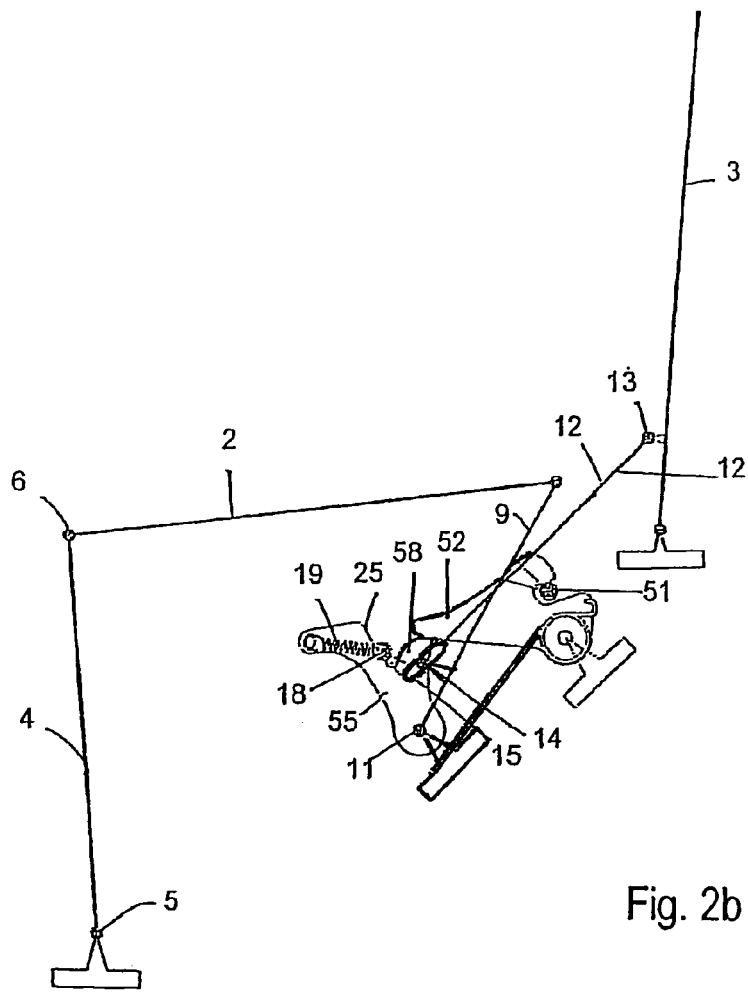

As shown in FIG. 2b, the pin 18 coupled to the coupling lever 12 has come to bear against the bearing surface 25 of the second lever 55 and the pin 14 is located close to the center of the longitudinal hole 15. In this position, the locking bolt is locked through the recess at the rear end of the locking lever 50.

Figure 3A:
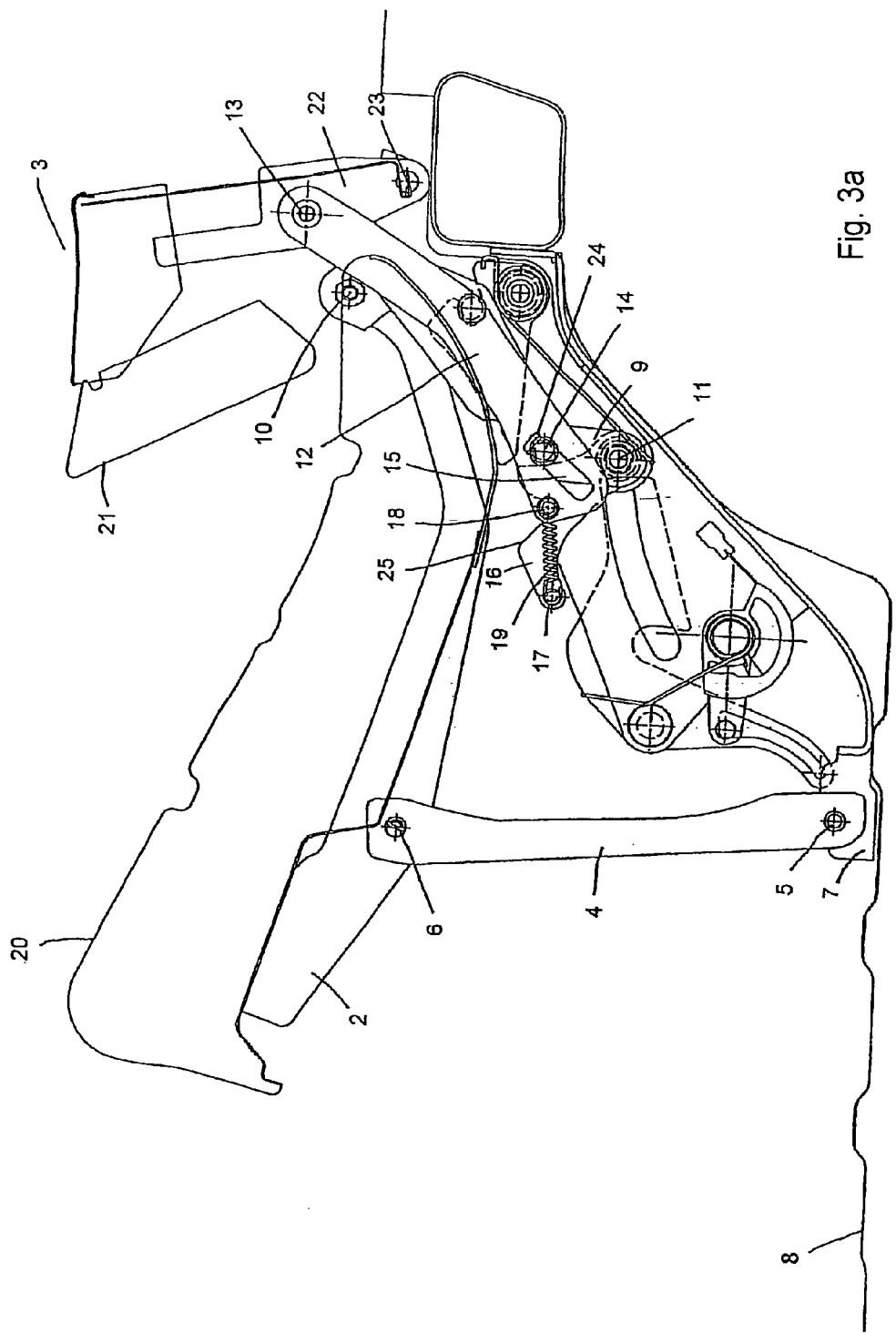
FIGS. 3a and 3b show the motor vehicle seat of FIGS. 1a and 1b, wherein the backrest has been folded forward to a predefined angle of inclination, in which position the seat part is unlocked.

As the backrest 3 is folded further forward, the coupling lever 12 is pushed further downward until finally, as shown in FIG. 3a, the pin 14 has reached almost the upper end of the longitudinal hole 15. Because the pin 18 is bearing against the bearing surface 25 of the locking lever 16, the locking lever 16 is pivoted in the counter-clockwise direction about the lower pivot axle 11 as the backrest 3 is folded further forward. Finally, the backrest 3 reaches a predefined angle of inclination in which the locking lever 16 is unlocked and the seat part 2 is released. In the unlocked position, the locking claw (not shown) of the locking lever 16 no longer engages in the locking catch fixed to the bodywork or in the locking bolt fixed to the bodywork. It is assumed that in the position shown in FIG. 3a the backrest 3 assumes the predefined angle of inclination. As shown in Fig 3a, in this position the pin 14 does not yet bear against the upper end of the longitudinal hole 15 but rather a clearance or gap 24 is formed between the pin 14 and the upper end of the longitudinal hole 15, which clearance or gap serves to compensate for manufacturing tolerances and the like.

Figure 3B:
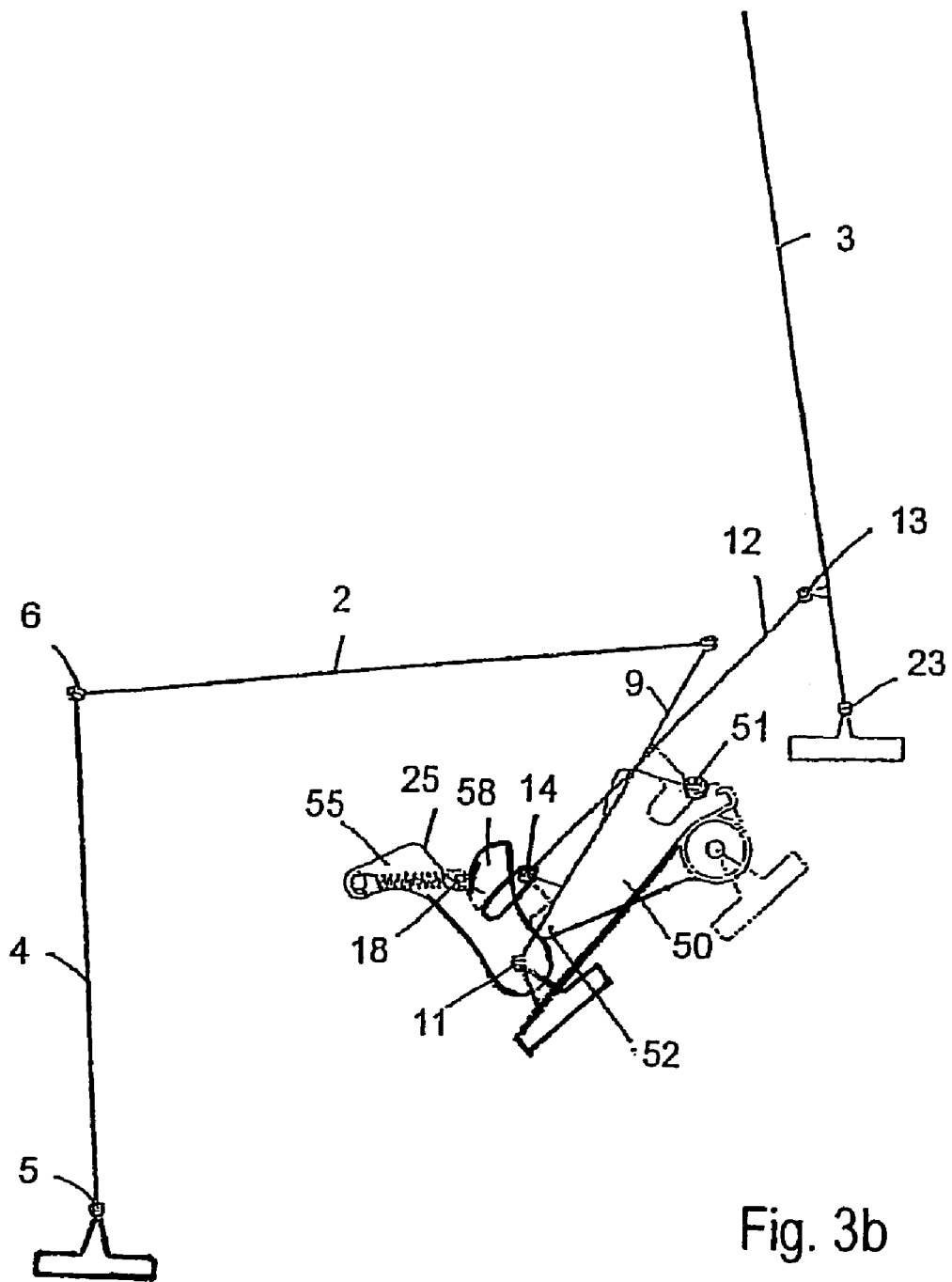

FIG. 3b shows the motor vehicle seat according to the second embodiment in a position in which the locking bolt 51 is released. As shown in FIG. 3b, the pin 18, bearing against the bearing surface 25, has pivoted the second lever 55 in the counter-clockwise direction to the extent that the actuating end 52 of the locking lever 50 has slid out over the shoulder 58 of the locking lever 50 and slid down the curved flank of the shoulder 58. As the actuating end 52 slides down the curved flank of the shoulder 58, the locking lever 50, which is biased into the released position by the torsion spring 60, is pivoted in the counter-clockwise direction, so that the recess at the rear end of the locking lever 50 finally releases the locking bolt 51 in order thus to unlock the seat part 2. Because the flank of the shoulder 58 is curved concavely inward, this movement of the locking lever into the released position can take place very quickly. The position in which the locking bolt 51 is released, and the movement sequence, are precisely defined by the geometry of the shoulder 58 and of the actuating end 52 of the locking lever 50.

Figure 4A:
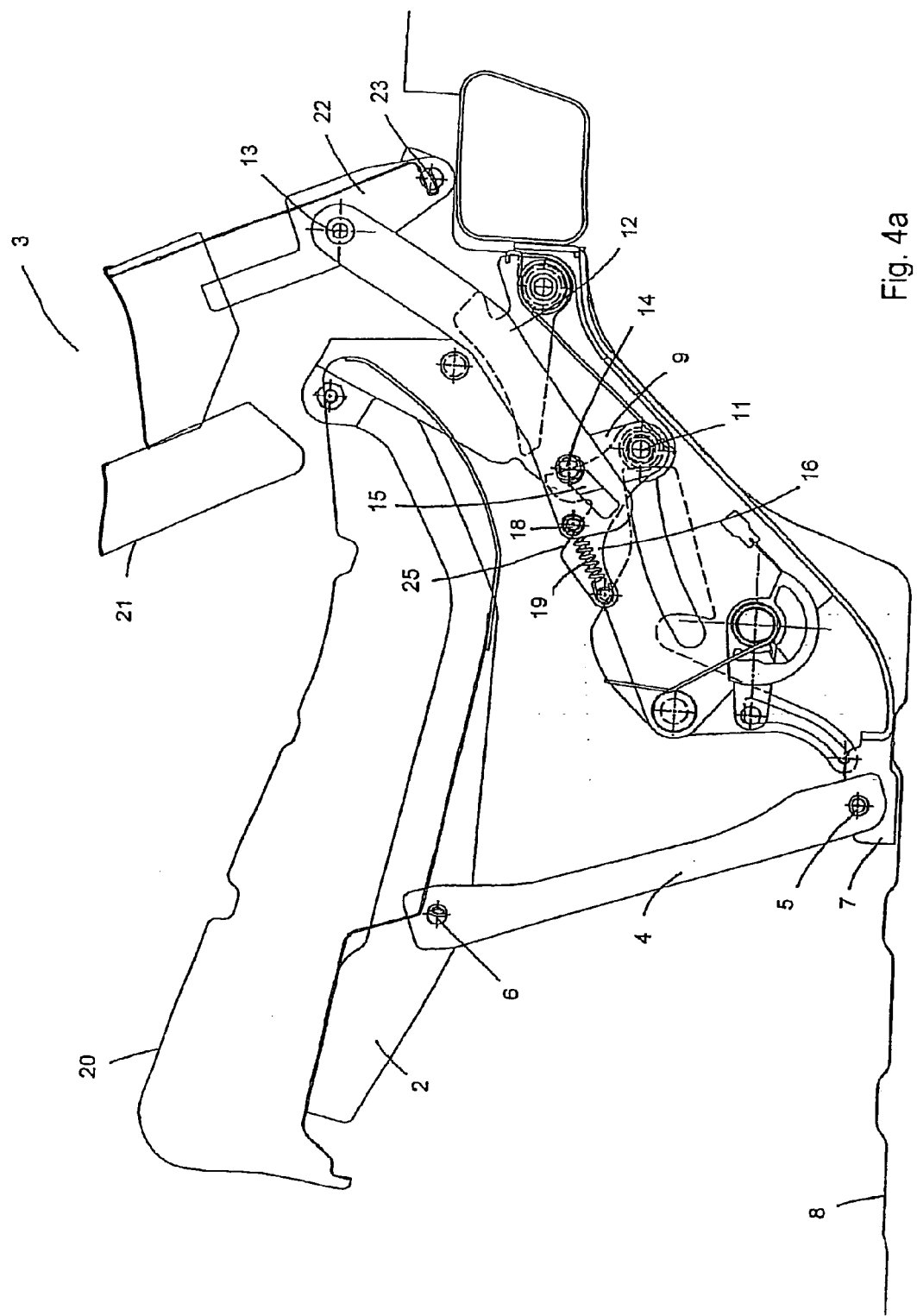
FIGS. 4a and 4b show the motor vehicle seat of FIGS. 1a and 1b, wherein the backrest is folded even further forward and the seat part is pivoted forward.

As the backrest 3 is folded further forward, the pin 14 finally comes to bear against the upper end of the longitudinal hole 15, so that the coupling lever 12 presses the pin 14 downward via the above-described rotary slide articulation and thus pivots the rear adjustment lever 9 forward in the counter-clockwise direction. In the process, the pin 18 projecting inward toward the seat on the coupling lever 12 slides further on the bearing surface 25 of the locking lever 16 and the locking lever 16 is pivoted further about the pivot axle 11 in the counter-clockwise direction without being in engagement with a locking element. The specific design of the front adjustment lever 4 and of the rear adjustment lever 9 to form a pivot lever device ensures that the seat part 2 with the padding 20 is moved forward and lowered as the backrest 3 is pivoted further forward. FIG. 4a shows the motor vehicle seat in a intermediate position with the backrest 3 folded forward.

Figure 4B:
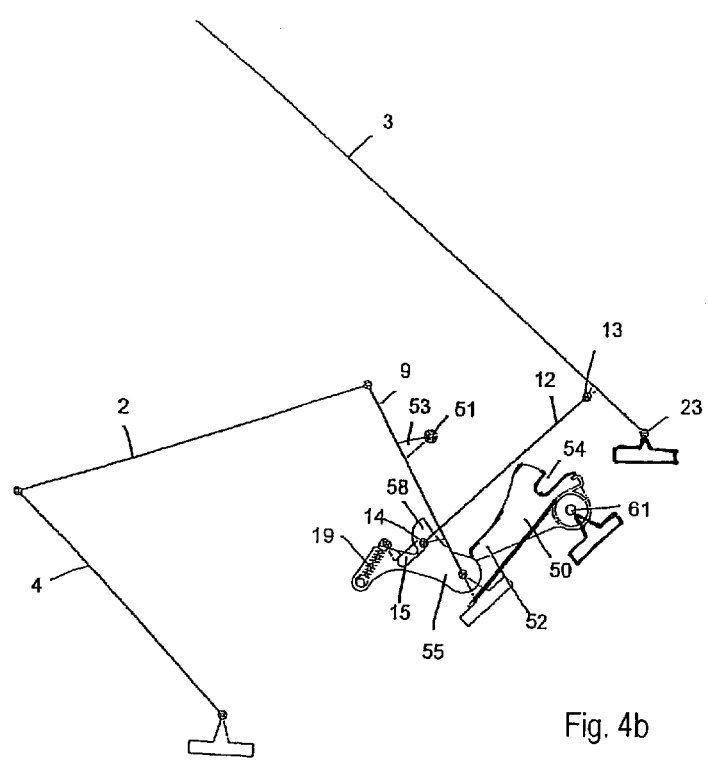

As shown in FIG. 4b, the second lever 55 is pivoted further forward in the counter-clockwise direction and the seat part 2 thus starts, in addition to the pivoting movement, also to be lowered. As shown in FIG. 4b, the actuating end 52 remains on the lower end of the second lever 55, so that the angular position of the locking lever 50 with the recess 54 for the locking bolt virtually does not change any more. As can be seen from FIG. 4b, the locking bolt is connected to the rear adjustment lever 9 via a connecting element 53, so that according to the second embodiment there is no need for any locking bolt fixed to the bodywork.

Figure 5A:
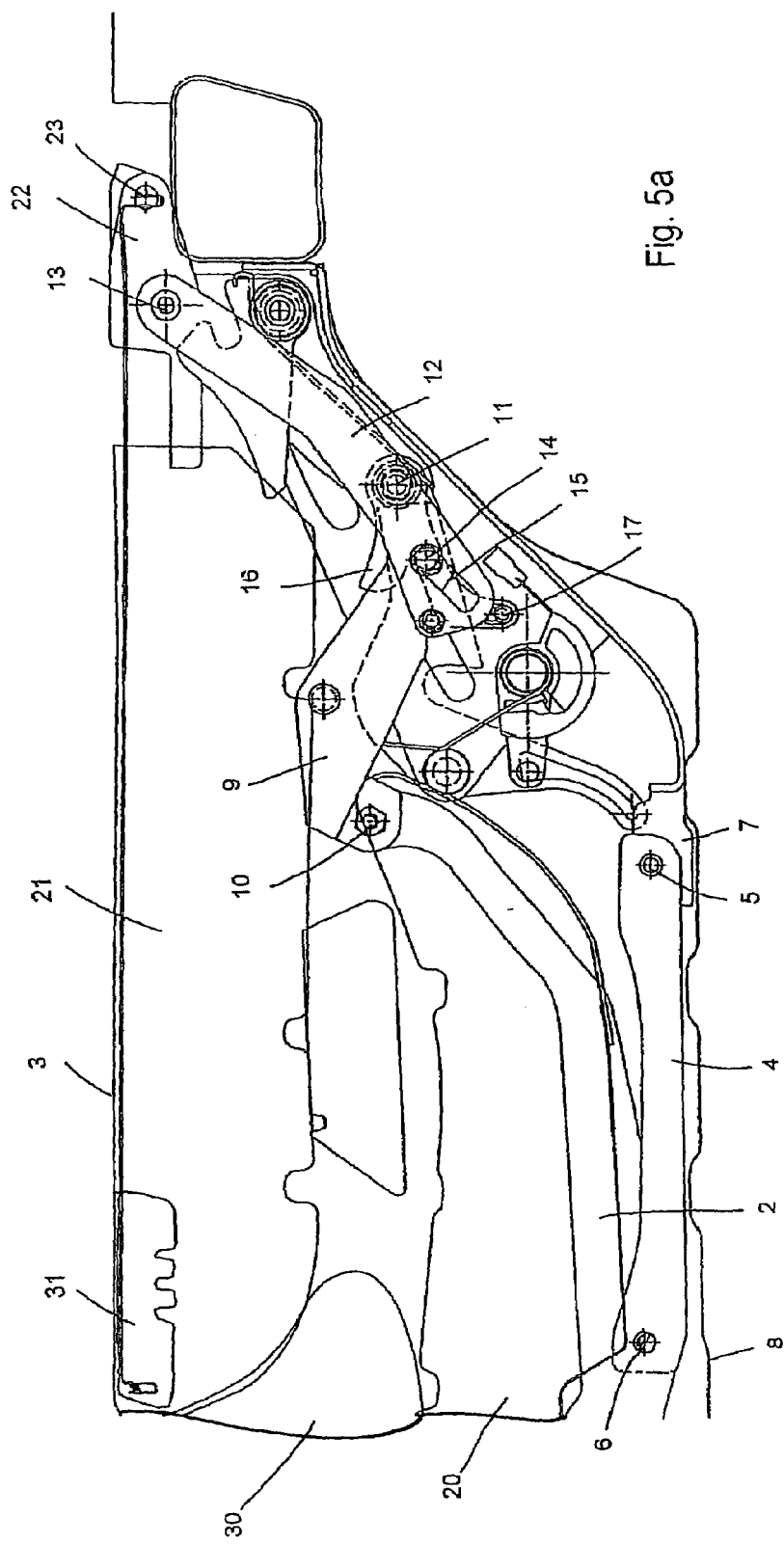
FIGS. 5a and 5b show the motor vehicle seat of FIGS. 1a and 1b in a position in which, in order to create a loading area, the backrest is folded onto the seat part and the seat part is moved or pivoted forward and lowered.
Figure 5B:
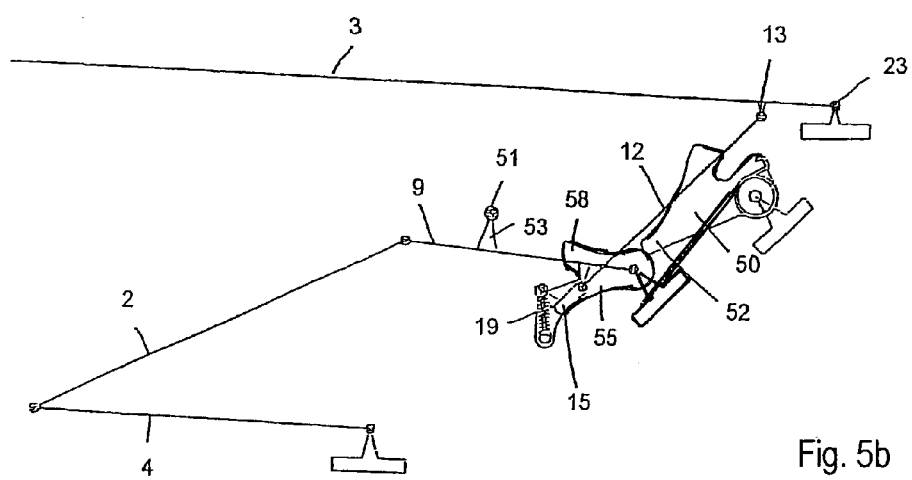

Finally, the position shown FIG. 5a is assumed, in which the backrest 3 is folded onto the seat part 2 to the extent that an essentially horizontal loading area is formed. In this position, the front adjustment lever 4 is pivoted fully forward and bears against the vehicle floor 8. The rear adjustment lever 9 is also pivoted fully forward and is essentially horizontal. In this position, the pin 14 still bears against the upper end of the longitudinal hole 15. As can readily be seen from FIGS. 3a to 5a, the locking lever 16 can be pivoted over a relatively large angular range, for example by about 90° or more, about the pivot axle 11 without engaging in a locking element or the like, for example in a locking bolt fixed to the bodywork.

In order to move the vehicle seat back to the use position shown in FIG. 1a, the above-described steps are carried out in reverse order, that is to say the backrest 3 is folded up in the clockwise direction until finally the locking lever 16 once again assumes the position shown in FIG. 2, in which the seat part 2 is locked. In the locked position of the seat part 2, the backrest 3 can continue to be freely pivoted backward, until finally the angle of inclination of the backrest 3 is fixed by locking the backrest 3, for example by means of the locking lever 31 shown in FIG. 6.

As can be seen by comparing FIGS. 3b and 4b, as the backrest 3 is being folded back the locking bolt 51 presses on the lower end of the receptacle 54 for the locking bolt 51, in order thus to exert a force on the locking lever 50. As a result, the locking lever 50 is pivoted in the clockwise direction about the axis of rotation 61 counter to the return force of the torsion spring 60. In the process, the actuating and 52 of the locking lever 50 slides along the concavely curved flank of the shoulder 58 of the second lever 55 until finally the upper end of the shoulder 58 is reached. As the backrest 3 is folded further back, finally the shoulder 58 of the second lever 55 snaps under the lower side of the actuating end 52 of the locking lever 50, on account of the return force exerted by the spring 19. The locking bolt 51 is finally locked again by the receptacle 54 and the locking lever 50. On account of the concavely inwardly curved flank of the shoulder 58 of the second lever 55, the locking of the locking bolt 51 takes place quickly as the backrest 3 is folded only slightly further back.

As can readily be seen from FIGS. 1 to 5b, the locking lever 16 or 50 is automatically actuated by the coupling lever 12 without actuating any other elements, for example a cable pull known from the prior art.

FIGS. 7a to 7d show a motor vehicle seat according to a third embodiment of the present invention in the movement phases shown in FIGS. 1a–4a and 1b–4b. In FIGS. 7a–7d, the essential levers are shown schematically only as line connections in order to facilitate comprehension. The same reference numerals in this case refer to the same elements as described above with reference to FIGS. 1 to 6, and hence the description thereof is omitted below.

As shown in FIGS. 7a–7d, the coupling lever 12 is designed as a two-part lever which is connected to the backrest 3 and the rear adjustment lever 9 via the articulation axles 41 and 43, respectively, and has a further articulation axle 42 at which the spring 19 is attached, for example via a pin or the like.

The locking mechanism is designed in a manner comparable to that of the second embodiment and comprises a locking lever 50 and a second lever 55.

Figure 7A:
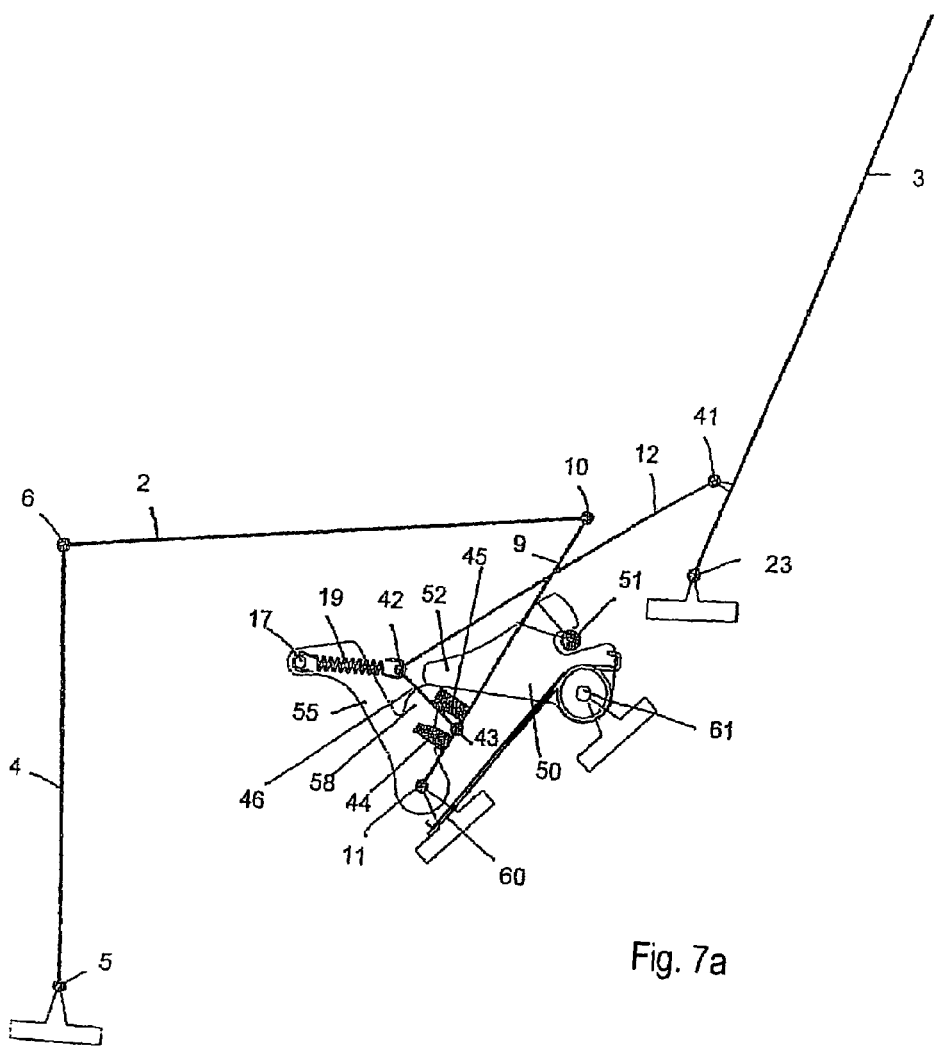
FIGS. 7a–7d show in a schematic overview five different phases during the forward-folding of the backrest of a motor vehicle seat according to a third embodiment of the present invention.
Figure 7B:
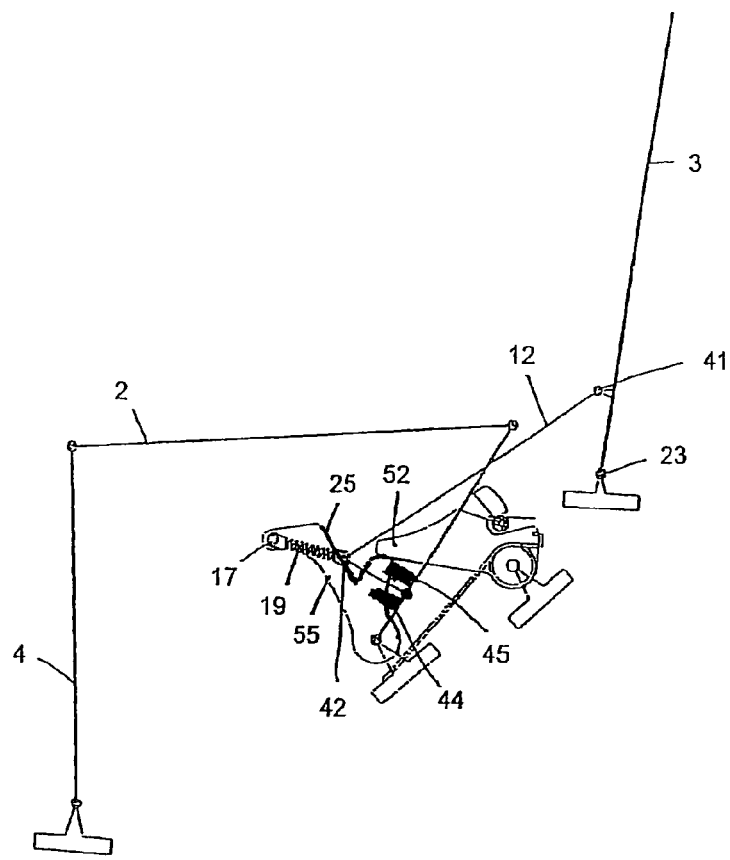

As shown in FIG. 7a, the arm 46 of the coupling lever 12 bears against the upper carrier 45 which is connected to the rear adjustment lever 9. The carrier 45 can thus be used to guide the seat part 2 back as the backrest 3 is being folded back.

By folding the backrest 3 forward in the counter-clockwise direction, the coupling lever 12 is pushed down and the pin at the articulation axle 42 comes to bear against the bearing surface 25 of the second lever 55. In the position shown in FIG. 7b, the arm 46 of the coupling lever 12 is located approximately in the center between the lower carrier 44 and the upper carrier 45 of the rear adjustment lever 9.

Figure 7C:
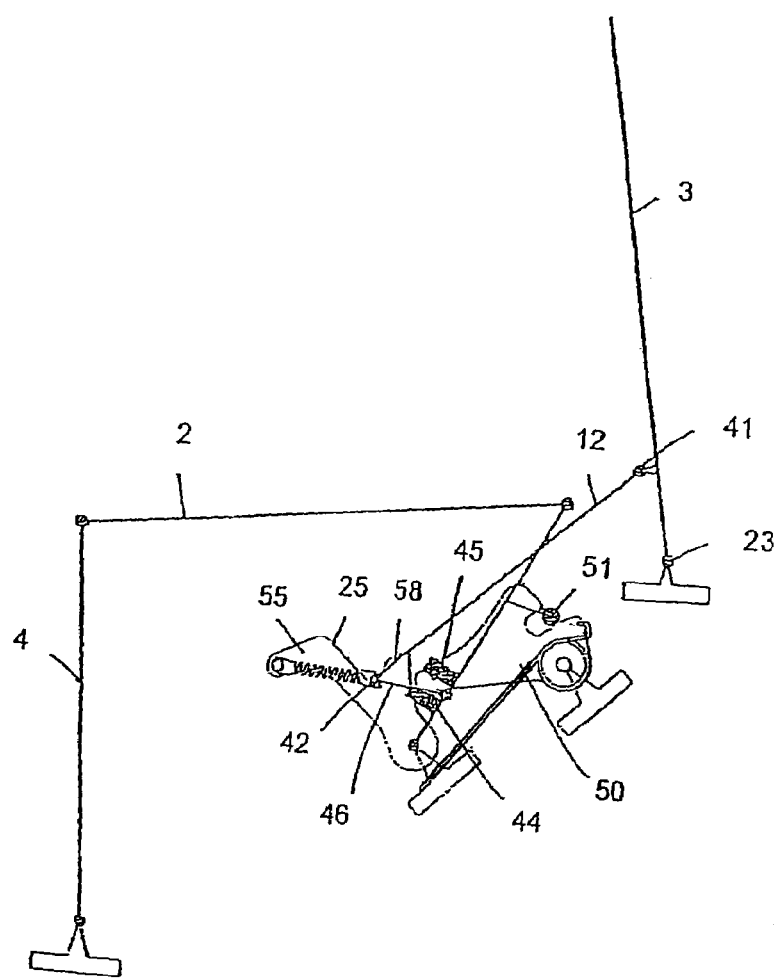

By folding the backrest 3 further forward, finally the locking lever 50 releases the locking bolt 51. In this position, as shown in FIG. 7c the arm 46 of the coupling lever 12 bears against the lower carrier 44.

Figure 7D:
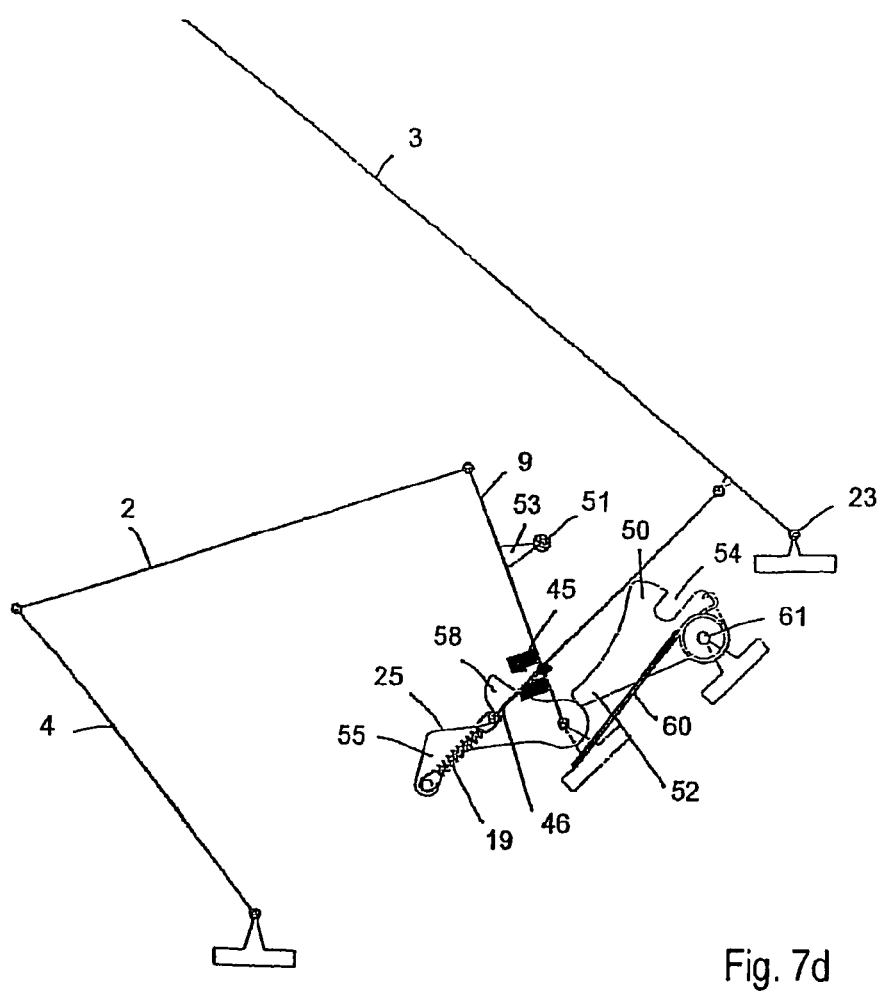

As the backrest 3 is folded further forward, the carrier 44 is carried by the arm 46 of the coupling lever 12 in order thus to pivot the rear adjustment lever 9 forward in the counter-clockwise direction and to lower the seat part 2, as shown in FIG. 7d.

As the backrest 3 is folded further forward, finally a position is reached in which a flat loading area is formed by the rear side of the backrest 3.

As can be seen from FIGS. 7a–7d, as the backrest 3 is folded back from the lowered position into the use position shown in FIG. 7a the rear adjustment lever 9 is carried by the carrier 45 which bears against the arm 46 of the coupling lever 12. The coupling lever 12 and the rear adjustment lever 9 are biased with respect to one another, for example by means of the tension spring 19. As the backrest 3 is pivoted back in the clockwise direction, the rear adjustment lever 9 is thus pivoted back in the clockwise direction and the seat part 2 is thus pushed backward and pivoted back.

The locking element 40 according to the third embodiment may of course also be a locking bolt fixed to the bodywork which is pushed down by the tilting lever 12 or by an element coupled to the latter. Of course, such a locking element according to the third embodiment may also be carried or released by a locking lever (not shown), for example in the manner described above with reference to FIGS. 1 to 5b.

Figure 8A:
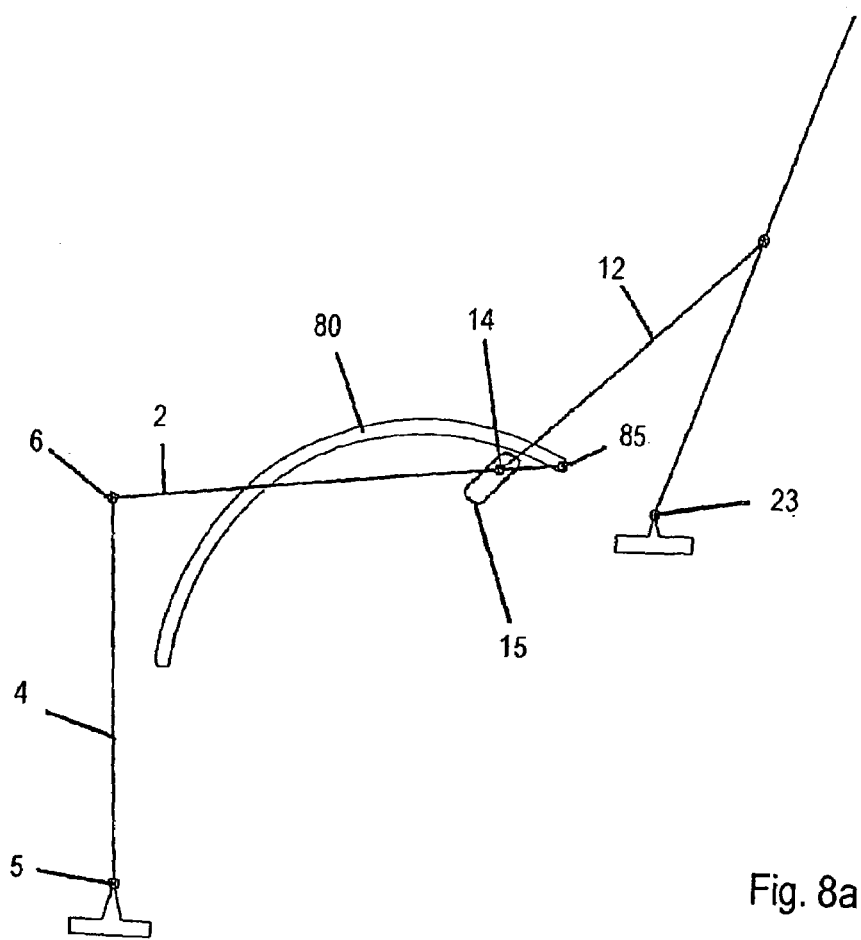
Figure 8B:
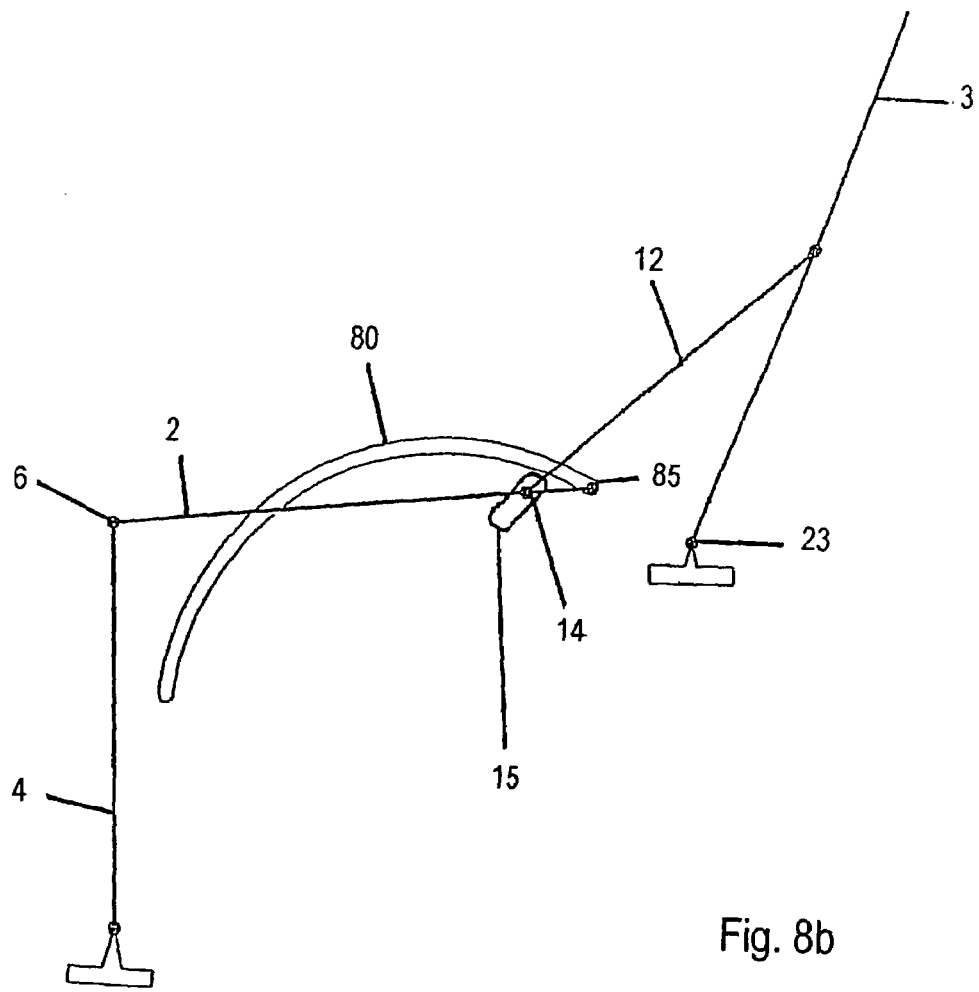

FIGS. 8a to 8c show by way of comparison further possible embodiments comprising at least one guide member for guiding the seat part as the seat part is being moved forward and lowered.

As shown in FIG. 8a, a curved guide member 80 is provided in which an element, for example a pin 85, at the rear end of the seat part 2 engages. The guide member 80 is fixed to the bodywork, for example in a side part (not shown) which is fixedly attached to the vehicle. By virtue of the shape of the guide member 80, as the backrest 3 is folded forward the front adjustment lever 4 is pivoted forward about the lower pivot axle 5 and thus lowers the seat part 2.

As shown in FIG. 8a, at the front end of the coupling lever 12 there is a longitudinal hole 15 in which a pin 14 engages in the manner described above, said pin being coupled to the seat part 2. As shown in FIG. 8b, the front end of the coupling lever 12 is articulated directly on the seat part 2. As shown in FIG. 8c, two curved guide members 81 and 82 are provided in which pins 85 and 86 connected to the seat part 2 engage in order to guide the movement of the seat part 2 as the backrest 3 is folded forward. As will be readily obvious to the person skilled in the art, such guide members may be combined in a suitable manner with further adjustment mechanisms, for example pivot lever devices, in order to control in a suitable manner the movement sequence as the backrest is folded forward. Furthermore, it will be readily obvious to the person skilled in the art that the guide members described as curved above may also be designed in some other way in order to suitably guide the movement of the seat part, for example in the form of guide members which run obliquely downward in an essentially rectilinear manner.

What is claimed is:

1. A motor vehicle seat comprising:
   a backrest; and
   a seat part;
   said backrest being foldable toward the seat part;
   said motor vehicle seat further comprising:
   a mechanism for lowering the seat part from a use position into a forward position;
   a locking mechanism for locking the seat part in the use position; and
   a coupling member for coupling the folding-down of the backrest to the forward movement and lowering of the seat part;
   wherein the coupling member couples the folding-down of the backrest to the forward movement and lowering of the seat part in such a manner that:
   the locking mechanism is automatically unlocked as the backrest is folded forward toward the seat part when a predefined angle of inclination is reached and the backrest is spaced apart from the seat part,
   the inclination of the backrest can be changed while the seat part is locked by folding the backrest forward up to the predefined angle of inclination and
   the unlocked seat part can be lowered into the forward position by folding the backrest further forward toward the seat part.

2. The motor vehicle seat as claimed in claim 1, in which the coupling member comprises at least one coupling lever, one end of which can pivot about an axle that is spaced apart from a backrest pivot axle and the other end of which is articulated to the mechanism for lowering the seat part into the forward position.

3. The motor vehicle seat as claimed in claim 2, in which the coupling lever respectively actuates a locking element in order to unlock the seat part when the backrest is folded forward to the predefined angle of inclination.

4. The motor vehicle seat as claimed in claim 3, in which the locking element has a locking claw which engages in a fixed locking catch or in a fixed locking bolt or presses down said locking catch or locking bolt.

5. The motor vehicle seat as claimed in claim 4, in which the locking element comprises a first locking lever which can pivot about a fixed pivot axle.

6. The motor vehicle seat as claimed in claim 5, in which the coupling lever respectively has a protrusion or a pin which comes to bear against the associated locking lever when the predefined angle of inclination is reached, in order to pivot said locking lever about the pivot axle when the backrest is folded further forward.

7. The motor vehicle seat as claimed in claim 2, in which the locking mechanism comprises a first and a second locking element which cooperate with one another in order to lock the seat part in the use position.

8. A motor vehicle seat, comprising a foldable backrest and a lowerable seat part, wherein:
the backrest can be folded toward the seat part and a mechanism is provided so that the seat part can be lowered from a use position into a forward position;
a coupling member is provided in order to couple the folding-down of the backrest to the forward movement and lowering of the seat part; and
a locking mechanism is provided in order to lock the seat part in the use position;
wherein the coupling member is designed to unlock the locking mechanism as the backrest is folded forward toward the seat part when a predefined angle of inclination is reached, so that the inclination of the backrest can be changed while the seat part is locked by folding the backrest forward up to the predefined angle of inclination and so that the unlocked seat part can be lowered into the forward position by folding the backrest further forward;
the coupling member comprises at least one coupling lever, one end of which can pivot about an axle that is spaced apart from a backrest pivot axle and the other end of which is articulated to the mechanism for lowering the seat part into the forward position;
the locking mechanism comprises a first and a second locking element which cooperate with one another in order to lock the seat part in the use position; and
the coupling lever cooperates with the second locking element such that the second locking element releases the first locking element when the backrest is folded further forward from the predefined angle of inclination, in order to release the seat part.

9. The motor vehicle seat as claimed in claim 8, in which the first and second locking element is in each case designed as a pivotably mounted lever.

10. The motor vehicle seat as claimed in claim 9, in which the second lever comprises a shoulder and a bearing surface opposite the shoulder for coupling to the coupling lever, wherein the shoulder releases the first lever when the backrest is folded further forward from the predefined angle of inclination.

11. The motor vehicle seat as claimed in claim 10, in which a locking bolt is connected or coupled to the seat part.

12. The motor vehicle seat as claimed in claim 8, in which a rotary slide articulation is formed at the other end of the respective coupling lever, wherein the respective coupling lever has a recess, preferably a longitudinal hole, in which there engages a protrusion, preferably a pin, of one lever of the mechanism for lowering the seat part into the forward position, and wherein the protrusion bears against a rear end of the recess when the seat part is pivoted forward and lowered as the backrest is folded forward.

13. The motor vehicle seat as claimed in claim 12, wherein the recess is designed such that a gap or clearance is left between the protrusion and the rear end of the recess when the backrest is inclined at the predefined angle of inclination and the seat part is unlocked.

14. A motor vehicle seat, comprising a foldable backrest and a lowerable seat part, wherein:
the backrest can be folded toward the seat part and a mechanism is provided so that the seat part can be lowered from a use position into a forward position;
a coupling member is provided in order to couple the folding-down of the backrest to the forward movement and lowering of the seat part; and
a locking mechanism is provided in order to look the seat part in the use position;
wherein the coupling member is designed to unlock the locking mechanism as the backrest is folded forward toward the seat part when a predefined angle of inclination is reached, so that the inclination of the backrest can be changed while the seat part is locked by folding the backrest forward up to the predefined angle of inclination and so that the unlocked seat part can be lowered into the forward position by folding the backrest further forward;
the coupling member comprising at least one coupling lever, one end of which can pivot about an axle that is spaced apart from a backrest pivot axle and the other end of which is articulated to the mechanism for lowering the seat part into the forward position;
the coupling lever respectively actuating a locking element in order to unlock the seat part when the backrest is folded forward to the predefined angle of inclination; and
the mechanism for lowering the seat part into the forward position comprises a lever which can pivot together with the locking element about a common axle.

15. A motor vehicle seat comprising a foldable backrest and a lowerable seat part, wherein:
the backrest can be folded toward the seat part and a mechanism is provided so that the seat part can be lowered from a use position into a forward position;
a coupling member is provided in order to couple the folding-down of the backrest to the forward movement and lowering of the seat part; and
a locking mechanism is provided in order to lock the seat part in the use position;
wherein the coupling member is designed to unlock the locking mechanism as the backrest is folded forward toward the seat part when a predefined angle of inclination is reached, so that the inclination of the backrest can be changed while the seat part is locked by folding the backrest forward up to the predefined angle of inclination and so that the unlocked seat part can be lowered into the forward position by folding the backrest further forward; wherein the coupling lever is designed as a two-part lever, wherein the mechanism for lowering the seat part into the forward position has a stop catch or carrier so that the coupling lever bearing against the stop catch or carrier actuates the mechanism for lowering the seat part into the forward position when the backrest is folded forward.

16. The motor vehicle seat as claimed in claim 15, in which the mechanism for lowering the seat part into the forward position comprises a further carrier for returning the seat part from the forward, lowered position to the use position.

17. The motor vehicle seat as claimed in claim 15, in which a releasable stop device is provided for fixing the angle of inclination of the backrest.

18. The motor vehicle seat as claimed in claim 17, in which the releasable stop device is designed to predefine a plurality of different angles of inclination.

19. The motor vehicle seat as claimed in claim 15, in which the mechanism for lowering the seat part into the forward position is designed as a pivot lever device with a first and a second pivot lever.

20. The motor vehicle seat as claimed in claim 15, in which the mechanism for lowering the seat part into the forward position comprises at least one guide member for guiding the unlocked seat part as it is moved forward and lowered.

21. The motor vehicle seat as claimed in claim 15, in which the backrest can be folded onto the seat part in order to create a loading area.

22. A motor vehicle seat, in particular a motor vehicle rear seat comprising:
a backrest; and
a seat part;
said backrest being foldable toward the seat part;
said motor vehicle seat further comprising:
a mechanism for lowering the seat part from a use position into a forward position;
a locking mechanism for locking the seat part in the use position; and
a coupling member for coupling the folding-down of the backrest to the forward movement and lowering of the seat part;
wherein the coupling member couples the folding-down of the backrest to the forward movement and lowering of the seat part in such a manner that
the locking mechanism is automatically unlocked as the backrest is folded forward toward the seat part when a predefined angle of inclination is reached and the backrest is spaced apart from the seat part,
that the inclination of the backrest can be changed while the seat part is locked by folding the backrest forward up to the predefined angle of inclination and that the unlocked seat part can be lowered into the forward position by folding the backrest further forward toward the seat part;

wherein the mechanism for lowering the seat part into the forward position is designed as a pivot lever device with a first and a second pivot lever; and the coupling member comprises at least one coupling lever, one end of which can pivot about an axle that is spaced apart from a backrest pivot axle and the other end of which is articulated to the mechanism for lowering the seat part into the forward position.

23. A motor vehicle seat comprising a foldable backrest and a lowerable seat part, wherein:

the backrest can be folded toward the seat part and a mechanism is provided so that the seat part can be lowered from a use position into a forward position;

a coupling member is provided in order to couple the folding-down of the backrest to the forward movement and lowering of the seat part; and a locking mechanism is provided in order to lock the seat part in the use position;

wherein the coupling member is designed to unlock the locking mechanism as the backrest is folded forward toward the seat part when a predefined angle of inclination is reached, so that the inclination of the backrest can be changed while the seat part is locked by folding the backrest forward up to the predefined angle of inclination and so that the unlocked seat part can be lowered into the forward position by folding the backrest further forward;

said coupling member comprising at least one coupling lever, one end of which can pivot about an axle that is spaced apart from a backrest pivot axle and the other end of which is articulated to the mechanism for lowering the seat part into the forward position;

said coupling lever respectively actuating a locking element in order to unlock the seat part when the backrest is folded forward to the predefined angle of inclination;

said locking element having a fixed locking claw which engages in a locking catch or in a fixed locking bolt or presses down said locking catch or locking bolt;

said locking element comprising a first locking lever which can pivot about a fixed pivot axle; wherein the coupling lever respectively has a protrusion or a pin which comes to bear against the associated locking lever when the predefined angle of inclination is reached, in order to pivot said locking lever about the fixed pivot axle when the backrest is folded further forward.

* * * * *